United States Patent
Labelle et al.

(10) Patent No.: US 7,569,797 B2
(45) Date of Patent: Aug. 4, 2009

(54) ELECTRIC LIQUID-HEATING

(75) Inventors: Guy Labelle, Champfleur (FR); Jean-Pierre Binot, St. Ouen de Mimbre (FR)

(73) Assignee: SEB S.A., Ecully (FR)

(*) Notice: Subject to any disclaimer, the term of this patent is extended or adjusted under 35 U.S.C. 154(b) by 385 days.

(21) Appl. No.: 11/547,142

(22) PCT Filed: Mar. 7, 2005

(86) PCT No.: PCT/FR2005/000545
§ 371 (c)(1),
(2), (4) Date: Oct. 4, 2006

(87) PCT Pub. No.: WO2005/107539
PCT Pub. Date: Nov. 17, 2005

(65) Prior Publication Data
US 2008/0023463 A1   Jan. 31, 2008

(30) Foreign Application Priority Data
Apr. 7, 2004  (FR) .................................. 0403662

(51) Int. Cl.
*F27D 11/00* (2006.01)
*A47J 27/62* (2006.01)

(52) U.S. Cl. .............. 219/438; 219/441; 219/492; 219/494; 219/497; 219/510; 99/333

(58) Field of Classification Search ........... 219/438, 219/441, 492, 494, 497, 510; 99/333
See application file for complete search history.

(56) References Cited

FOREIGN PATENT DOCUMENTS

| EP | 0 549 953 | 7/1993 |
| GB | 2 272 629 | 5/1994 |
| GB | 2272629 | * 5/1994 |

* cited by examiner

*Primary Examiner*—Shawntina Fuqua
(74) *Attorney, Agent, or Firm*—Young & Thompson (57) ABSTRACT

An electric liquid-heating appliance includes a housing, an upper fill hole which is defined by a rim (9), heating elements, a spout and a lid. The lid includes: a lock which can engage with a retaining element; a locking control element which is connected to the lock and which can move between a locked position and an unlocked position; and a tongue which can move between a retracted position, in which the tongue is housed in the lid, and a deployed position, in which the tongue seals the spout. The tongue is connected to the locking control element by an actuating mechanism which is designed to position the tongue either in the deployed position when the locking control element is in the locked position or in the retracted position when the locking control element is in the unlocked position, the unlocked position being stable.

18 Claims, 6 Drawing Sheets

ELECTRIC LIQUID-HEATING

BACKGROUND OF THE INVENTION

1. Field of the Invention

The present invention relates to an electrical apparatus for heating liquid, such as for example an electric kettle. More particularly, the invention relates to an electric apparatus for heating liquid comprising a housing which defines a chamber adapted to contain a liquid, an upper opening for chilling the chamber, which is delimited by a rim, electric heating means for the liquid, a spout communicating with said chamber and extending adjacent the opening, and a lid adapted to close said opening, said lid comprising:

- a movable lock which is adapted to come into engagement with a retaining element of the housing;
- a lock control connected to the lock and movable between a locked position in which the lock is in engagement with the retaining element when the lid is in place and an unlocked position in which the lock is inoperative; and
- a tongue movable between a retracted position in which it is disposed in the lid and an extended position in which it closes the spout.

2. Description of the Related Art

The document FR-A-2 756 476 describes en electric kettle of this type whose lid is removable and is provided with a tongue movable between an extended position and a retracted position in the lid. In the extended position, the tongue closes the spout. Thus, loss of heat is limited if the liquid contained in the kettle has first been heated. Moreover, if the kettle is tilted, the tongue prevents flow of liquid for an important distance and limits the flow of liquid which can flow through the spout.

However, the tongue disclosed in FR-A-2 756 476 is always returned to the extended position, such that when the lid is raised to fill the kettle, the latter is particularly in the way. Moreover, if the lid is lowered, the tongue which is provided by a blade of relatively thin plastic material, can be damaged or even break.

SUMMARY OF THE INVENTION

The present invention has for its object to overcome these drawbacks by proposing an electrical apparatus for heating liquid having a lid whose size and solidity are equivalent to lids of kettles not having a tongue, whilst remaining practical to use.

To this end, the present invention has for its object an apparatus of the mentioned type, characterized in that the tongue is connected to the locking control by an actuating mechanism adapted to place the tongue either in an extended position when the locking control is in locked position, or in a retracted position when the locking control is in an unlocked position, said unlocked position being stable.

Thus, when the user raises the lid to fill the kettle, he places the locking control in unlocked position, and as a result, the tongue will automatically be in retracted position, then he raises the lid from the rim of the opening with the tongue which remains in retracted position because the unlocked position of the control is stable.

In preferred embodiments of the invention, use is also made to one end or the other of the following arrangements:

- the tongue is mounted slidably relative to the lid in a substantially radial direction relative to the normal direction of the opening, and in which the locking control is rotatably mounted relative to the lid about an axis substantially parallel to said normal direction, particularly for reducing the height of the lid;
- the lid is removably mounted in the rim of the opening, and comprises a bottom coming into contact with said rim of the opening and in an upper surface which forms the locking control, said bottom and said rim having reliefs adapted to coact so as to prevent the rotation of the bottom relative to the housing;
- the actuating mechanism comprises a pivoting lever provided with a cam, and the locking control has an internal surface comprising a cam guide which extends from a first end to a second end arranged at a distance from the pivotal axis of the locking control which is greater than the distance of the first end to said axis, said cam following said cam guide of the first end to the second end when the locking control passes from the unlocked position to the locked position, and vice versa;
- the pivoting lever has a first end comprising a lug which forms the lock, which is retracted in the lid when the locking control is in the unlocked position, and which projects through a window of the lid when the locking control is in locked position, said lug being adapted to come into engagement with the retaining element arranged in the rim of the opening when the locking control passes from the unlocked position to the locked position;
- the cam of the pivotal lever is urged against the cam guide of the locking control by resilient means; thus, the tongue is adapted to be retracted by spacing the cam from the pivoting lever of the cam guide, which is to say other than by the locking control;
- the actuating mechanism comprises a member pivoting about an axis substantially parallel to the normal direction of the opening, and the pivoting lever has a second end provided with a tooth which engages a first toothed sector provided on the pivoting member, said pivoting member being provided with at least one second toothed sector which engages a linear rack connected to the tongue;
- said lever and pivoting member are adapted to create an amplified linear movement of the tongue relative to the movement of the first end of said lever;
- the assembly of the elements of the actuating mechanism is movable in a plane parallel to the mean plane of the opening, such that the lid will also be as small as possible;
- the housing has an opening which opens into the spout and into which extends the tongue when the locking control is in locked position.

BRIEF DESCRIPTION OF THE DRAWING FIGURES

Other characteristics and advantages of the invention will become apparent from the following description, given by way of non-limiting example, with reference to the accompanying drawings, in which.

DETAILED DESCRIPTION OF THE INVENTION

In the different figures, the same reference numerals are used to designate identical or similar elements.

Figure 1:
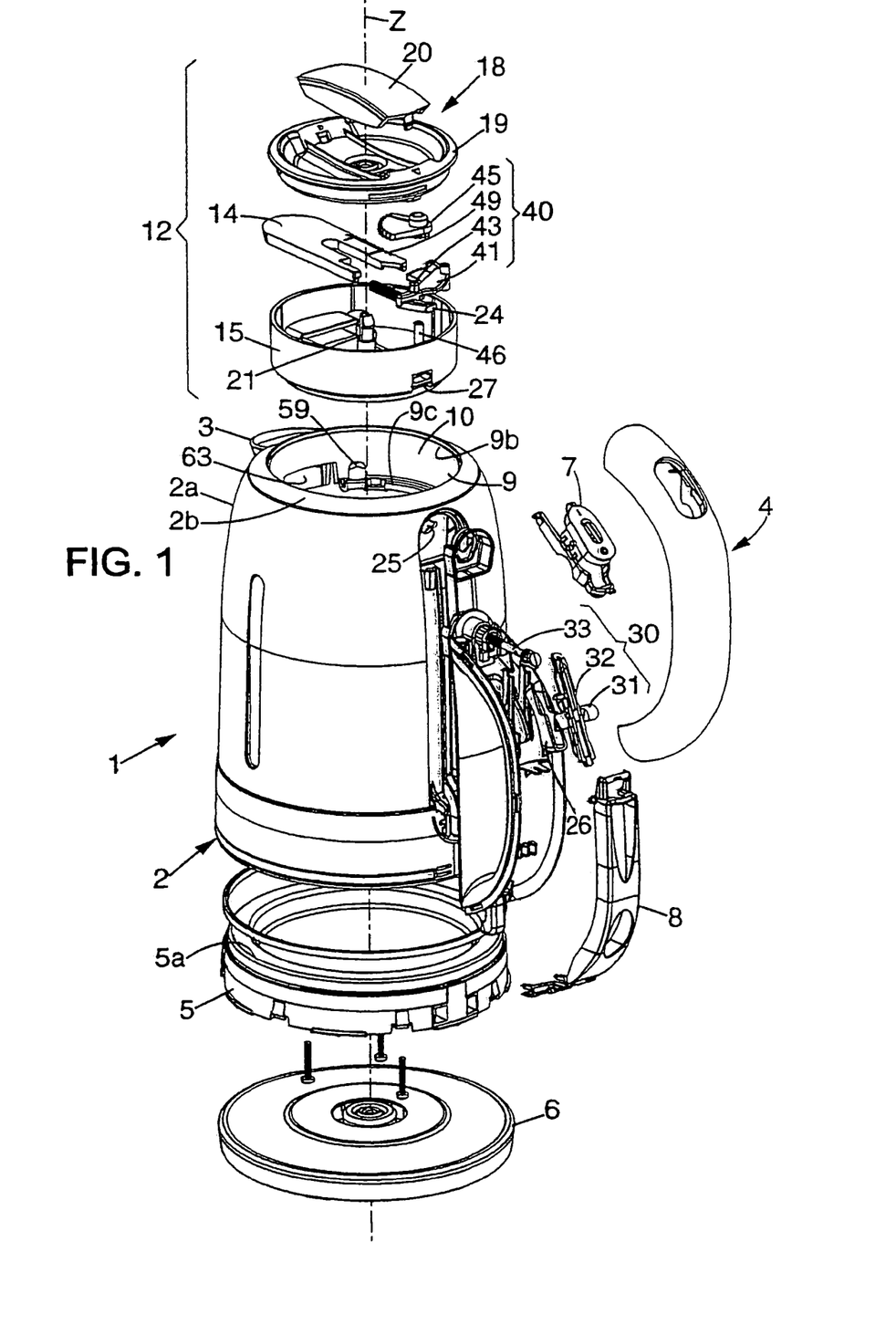
FIG. 1 is an exploded perspective view of the principal elements of a kettle made according to the invention which comprises a lid provided with locking control and a handle.

The electric kettle 1 shown in FIG. 1 comprises a housing 2 whose body 2a defines a substantially cylindrical chamber centered on a vertical axis Z. The housing 2 also comprises a spout 3, a handle 4 and a bottom 5.

The bottom 5 comprises a metallic plate 5a delimiting the bottom of the chamber which is in contact with an electrical resistance, not shown, so as to heat the water or any other liquid contained in the chamber.

The bottom 5 of the kettle is adapted to rest on base 6 provided at its center with an electrical connection. The bottom 5 comprises in known manner a fitting adapted to establish an electrical connection with the connection of the base 6 no matter what the orientation of the kettle resting on the base. The interior of the base 5 comprises, in addition to the electrical resistance, a switch to establish a connection between the connection and the electrical resistance. The operation of the kettle is controlled by an on/off button 7 arranged on the handle 4 and connected to the switch by a lever 8.

The housing 2 has in its upper portion a rim 9 which defines an opening 10. This opening 10 has a relatively extended surface so as to permit easy filling of the chamber. The rim 9 is formed by an annular wall of the housing which has a vertical cylindrical portion 9b coaxial with the axis Z and a collar 9c extending radially toward the central axis Z from the base of the vertical portion. The surface of the opening thus defined by the rim 9 has a normal direction co-linear to the central axis Z. However, the chamber in the opening 10 could have other configurations than cylindrical or could have other asymmetrical axes which would not be co-linear.

Figure 4:
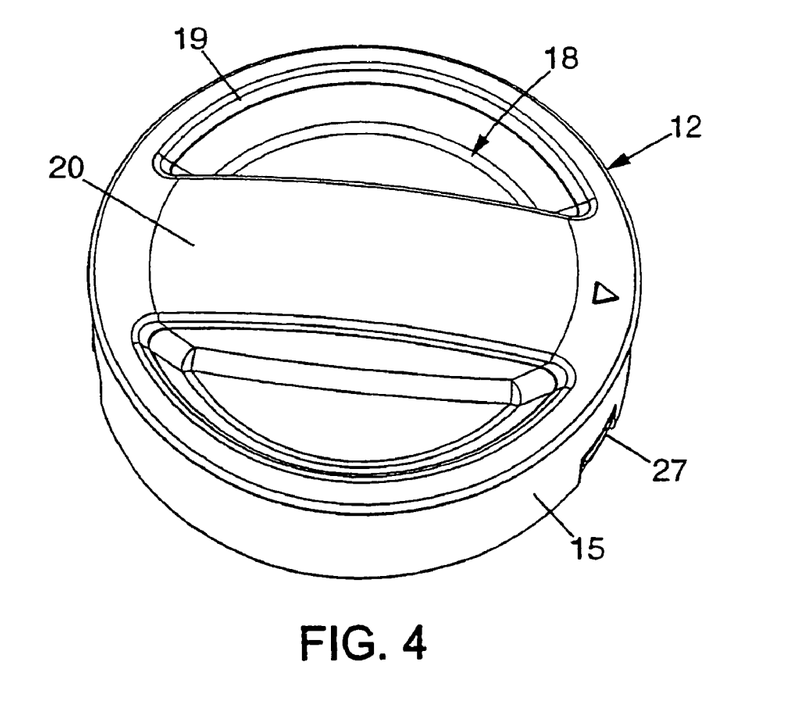
FIG. 4 is a perspective view of the lid with the locking control in unlocked position.

The kettle also comprises a removable grid 12 adapted to close the opening 10, which here as the form of a cylinder of small height as is better shown in FIG. 4, so as to coact with the rim 9 of the opening. But the lid could have a different shape, particularly in the case in which the rim of the opening would be an overall flat surface extending essentially in a plane transverse to the central axis Z.

Figure 2:
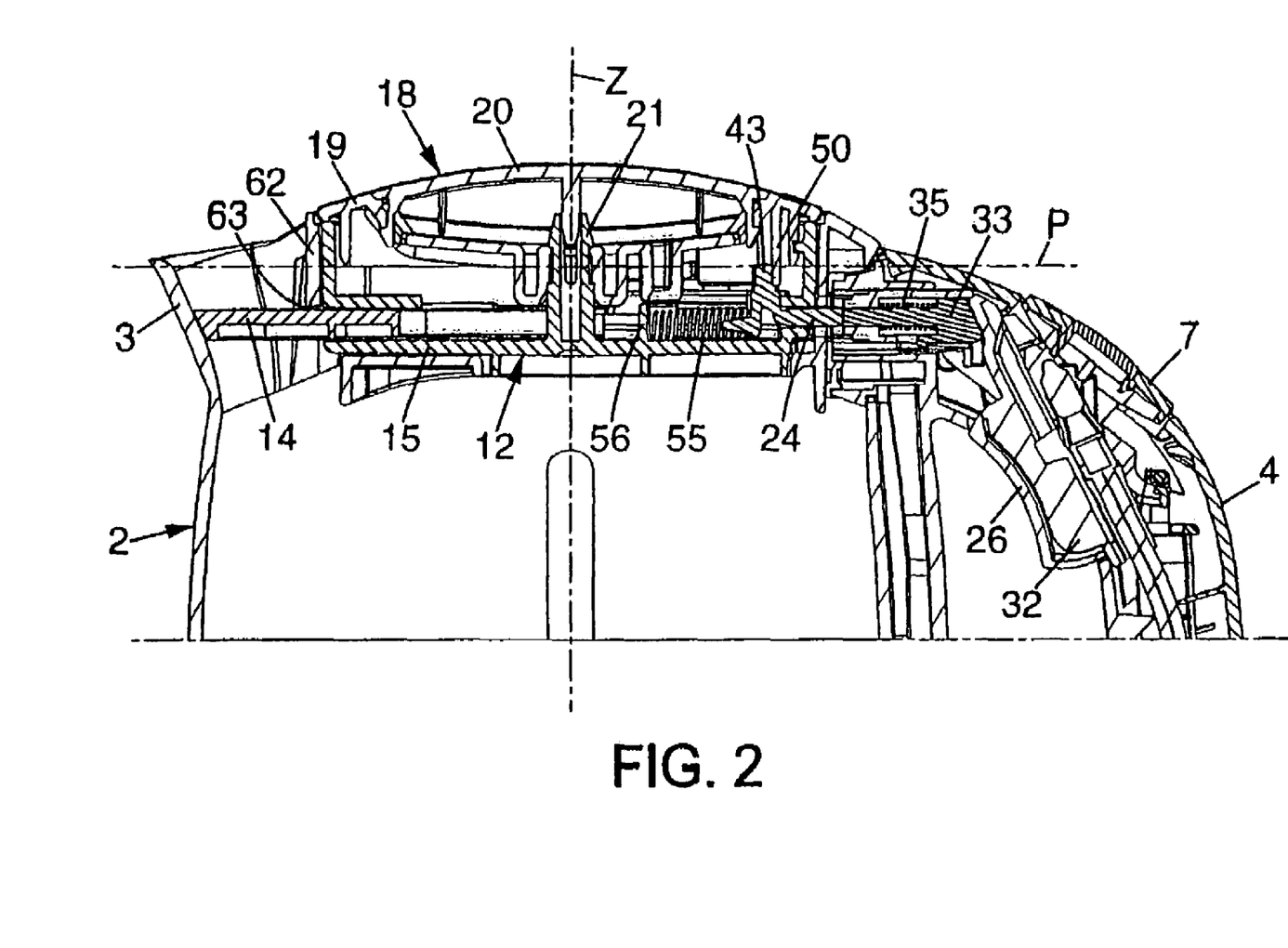
FIG. 2 is a partial longitudinal cross-sectional view in the plane of the handle of the kettle shown in FIG. 1.
Figure 5:
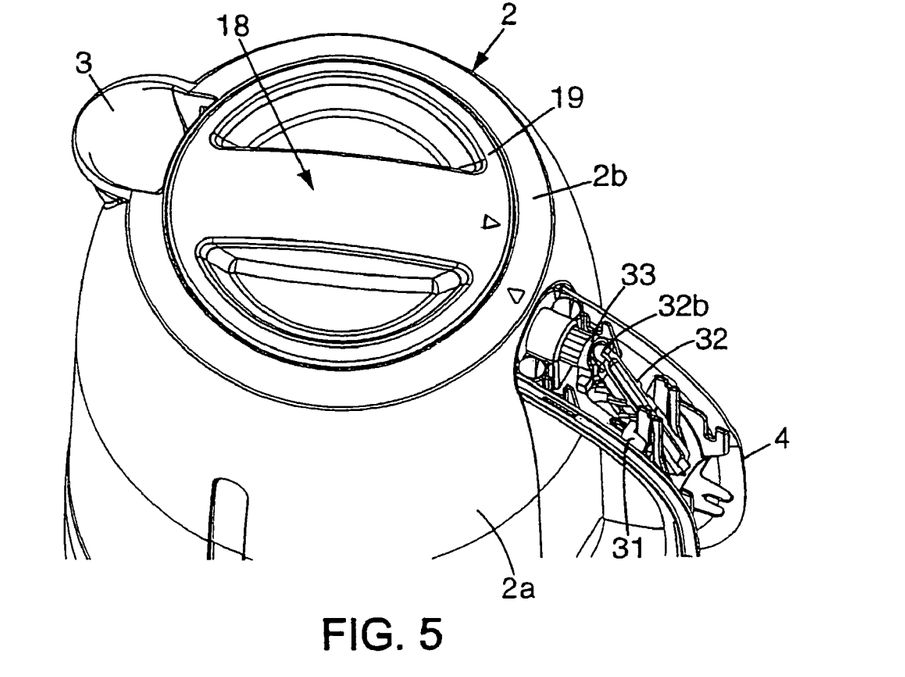
FIG. 5 is a fragmentary perspective view of the kettle with the lid and the locking control in unlocked position.
Figure 6:
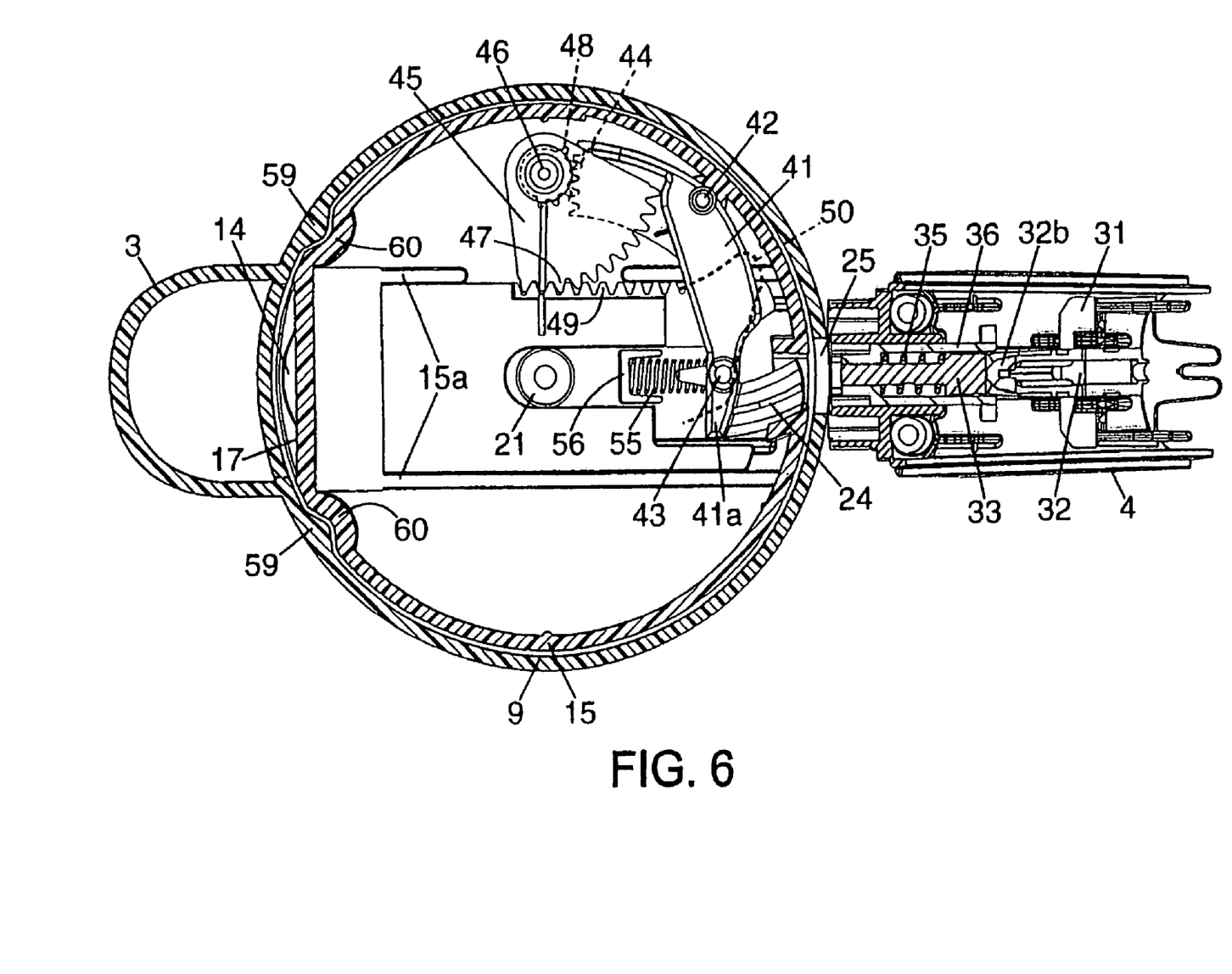
FIG. 6 is a broken away and simplified top plan view of FIG. 5.
Figure 7:
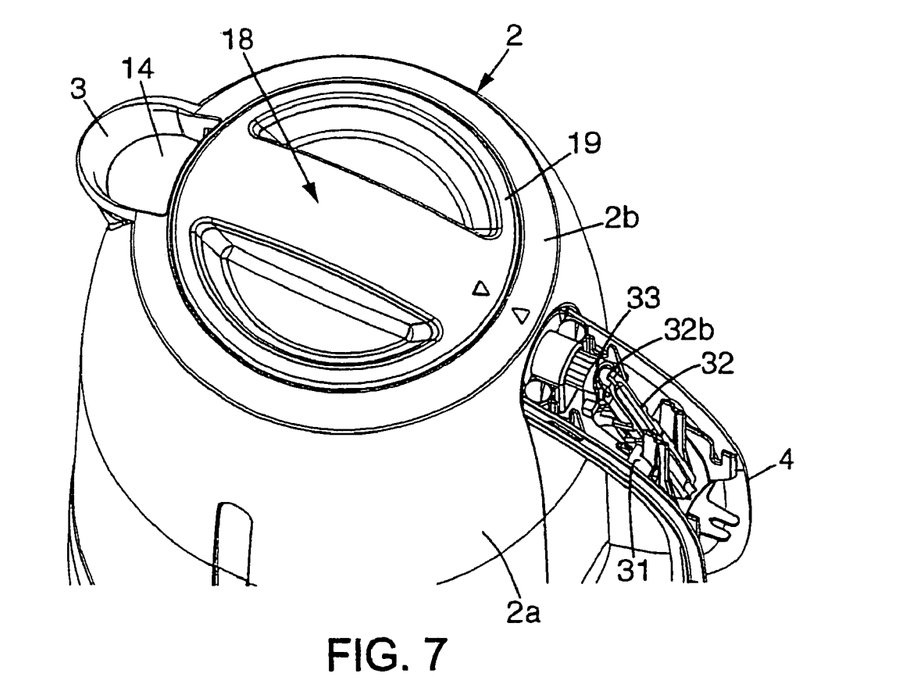
FIG. 7 is a view similar to FIG. 5, in which the locking control is in the locked position.
Figure 8:
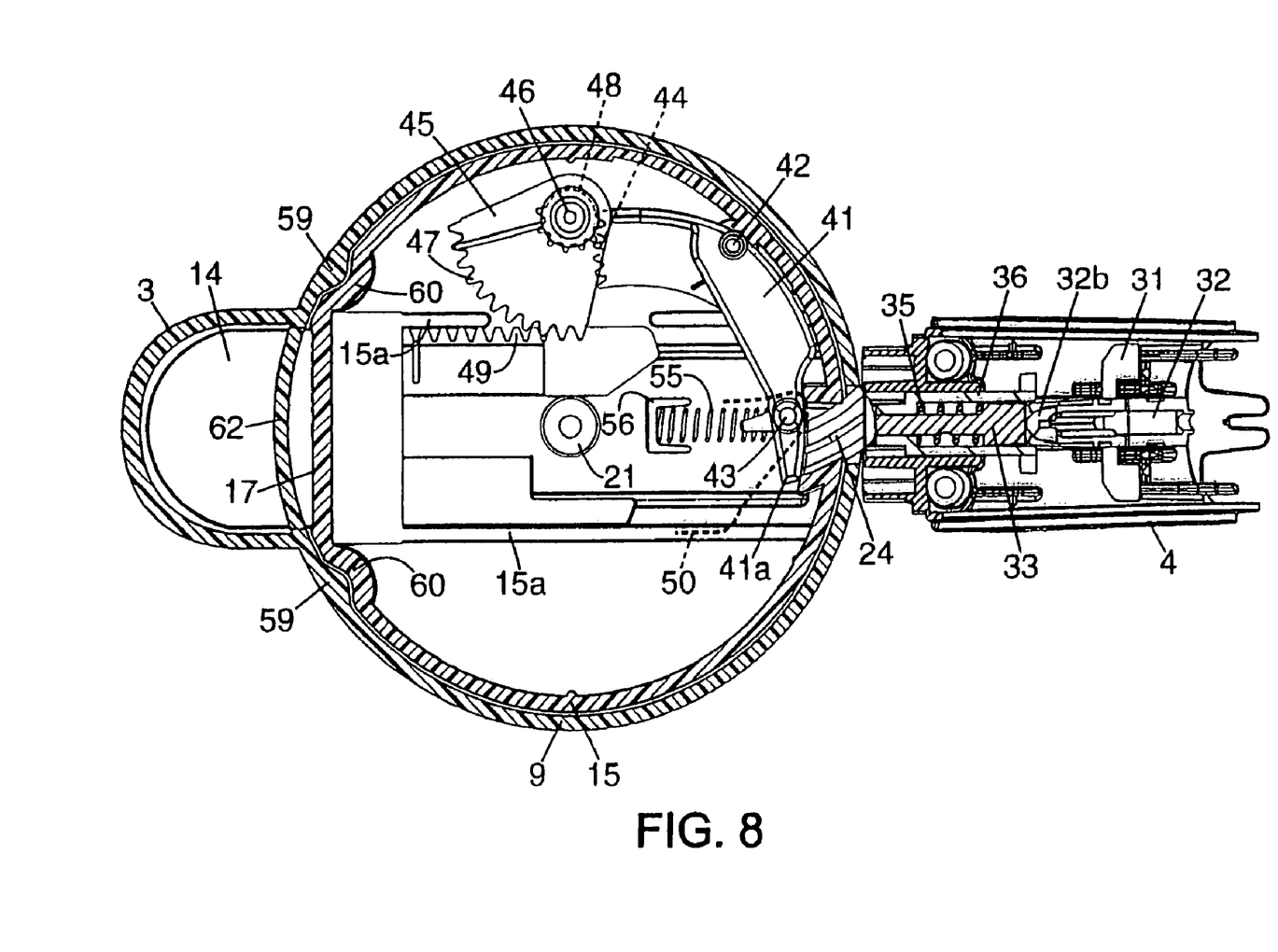
FIG. 8 is a view similar to that of FIG. 6, in which the locking control is in the locked position.

The lid 12 comprises a tongue 14 movably mounted on the latter between a retracted position, shown in FIGS. 4, 5 and 6, in which it is disposed in the lid, and an extended position, visible in FIGS. 2, 7 and 8, in which it extends beyond the lid so as to close the spout 3. The closure effected by the tongue is not completely sealed, but permits avoiding important projections of liquid in the case in which the kettle is tilted.

Of course, the spout 3 must extend at least in part adjacent the opening 10 such that the tongue 14 connected to the lid 12 will not extend a distance too great between the opening and the spout, and keep a relatively simple shape. However, the spout 3 could have a more projecting shape relative to the body 2a of the housing.

In the illustrated embodiment, the movement of the tongue 14 is guided within a piece in the form of a cup 15 which forms the bottom of the cover 12. This bottom 15 has on its internal surface two ribs 15a (FIGS. 6 and 8) which guide the tongue 14 in a radial direction relative to the central axis Z through an opening 17 (FIG. 6).

The cover 12 is moreover provided with a locking control 18 which comprises a first element 19 forming the upper circular surface of the cover and a gripping member 20 assembled on the upper surface by snapping in.

The locking control 18 is rotatably mounted about an axle 21 secured to the bottom of the cover and extending along the central axis Z. The locking control 18 turns through an angle of about 30°, for example in the clockwise direction, between two positions, called respectively unlocked and locked, which are indicated by markings in the form of an arrow on the upper surface 19 of the lid and on the upper edge 2b of the housing, at the level of the handle 4.

The cover 12 moreover comprises a lug 24 movable between a retracted position and an extended position in which it coacts with a window 25 passing through the rim 9 of the opening. The lug 24 forms a first lock which comes into engagement with a retaining element of the housing formed by the window 25, thereby preventing the retraction of the lid 12 from the kettle.

The handle 4 of the kettle is in the form of a loop, but could be open. It has on its surface facing the body 2a an opening through which a trigger 26 is movably mounted. The trigger 26, thus disposed below the handle, is in the form of a first mechanism 30, called trigger mechanism, to carry out a pouring control. The pouring control permits the user to more or less retract the tongue 14 into the lid 12 so as to open the passage of the spout 3 when he wishes to pour the liquid contained in the kettle.

The locking control 18 is connected to the tongue 14 and to the lug 24 by a second mechanism 40, called an actuating mechanism, which will be detailed hereafter. The locking control 18 is stable in each of its locked/unlocked positions. This stability can be obtained by friction of the upper surface 19 against the upper edge of the bottom 15, but also thanks to the actuating mechanism 40. It will be noted that this stability can be differently obtained, particularly if the locking control does not rotate, but slides along a cam path which could thus comprise means for blocking the control in the unlocked position.

The trigger mechanism 30 comprises the trigger 26 projecting through an opening of the handle and secured at a first end of the lever 32 swingably mounted about an axle 31, as well as a piston 33 slidably mounted in a radial direction and against which bears a second end 32b of the swinging lever 32. The piston 33 slides in a tubular member 36 in which is disposed a spring 35 to return the trigger 26 to inactive position.

The actuating mechanism 40, which permits achieving the object of the present invention, connects the locking control 18 to the tongue 14. The actuating mechanism 40 comprises a lever 41 pivoting about an axle 42 parallel to the central axis Z. Adjacent a first end 41a of the pivoting lever is arranged a lug 24 and a cam 43 in the form of a cylindrical vertical pin. The lug 24 extends in the arc of a circle in the mean plane of the opening and in an overall radial direction relative to the central axis Z. The pivoting lever 41 has at a second end teeth 44 in the arc of a circle.

The actuating member 40 also comprises a member 45 pivoting about an axle 46 which is also parallel to the central axis Z. The pivoting member 45 comprises a first toothed sector 47 of a relatively great radius and a second toothed sector 48 coaxial to the first, but of substantially lesser radius. The second toothed sector 48 engages the teeth 44 of the pivoting lever 41, such that the pivoting of the lever 41 causes movement in the opposite direction of the member 45. Because the teeth 44 of the lever 41 have a radius, measured relative to the axle 42, greater than the radius of the second teeth 48, the pivoting in the opposite direction of the member 45 is amplified relative to the pivoting of the lever 41.

The first toothed sector 47 of the pivoting member 45 engages a straight rack 49 formed on a tongue which extends in prolongation of the rear end of the tongue 14. In the present embodiment, the straight rack is integrally formed with the tongue 14 and thus is secured to this latter. However, it is envisageable to provide a certain play or a resilient means between the straight rack and the tongue, for example such that the tongue will come into more or less sealed contact against the internal wall of the spout 3.

The engagement of the first toothed sector 47 with the straight rack 49 permits transforming the pivotal movement of the member 45 into a translatory horizontal movement of the tongue 14, which translation is further amplified relative to the amplitude of movement of the first end 41a of the pivoting lever 41 by the difference of the radii existing between the first and second toothed sectors (47, 48). By way of example, there is obtained a movement of 27 mm of the tongue 14 for a radial movement of the end of the lug 24 of about 4 mm.

Figure 3:
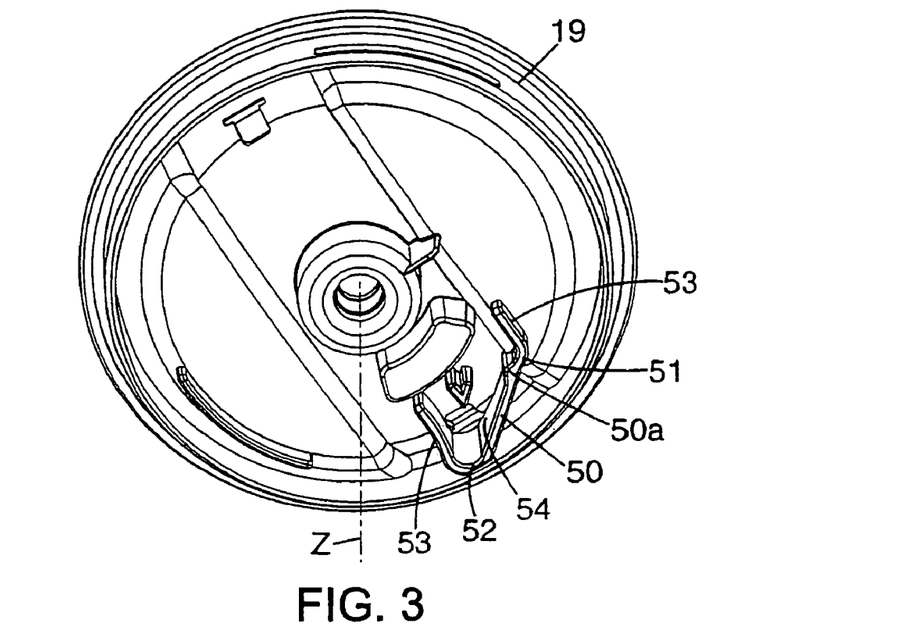
FIG. 3 is a bottom perspective view of an element of the lid.

As is better seen in FIG. 3, the interior side of the upper surface 19, which forms the locking control 18, comprises a cam guide 50 which extends along the central axis Z from the internal side and along a chord of the upper circular surface 19 between a first end 51 and a second end 52. The ends 51 and 52 are prolonged by tongues 53 which extend parallel to the diameter of the circular surface. The first end 51 is located at a distance from the pivotal axis that coincides with the central axis Z, which is less than the distance of the second end 52 to this pivotal axis. The angular sector formed between the first end 51, the axis Z and the second end 52, is about 30°.

The guide of the cam 50 is also present in the form of a wing with a lateral surface 54 oriented toward the central axis Z against which the cam 43 of the pivoting lever 41 comes to bear. The contact of the cam 43 is obtained thanks to a helicoidal compression spring 55 disposed between an abutment 56 secured to the bottom 15 of the lid 12 and the first end 41a of the pivoting lever 41. Because of the elasticity of the bearing of the cam 43 against the cam guide 50, it is possible to space this latter from the cam guide 50, particularly with the help of trigger mechanism 30, so as more or less to retract the tongue 14 in the cover, and this with the locking control 18 held in locked position.

But it is envisageable in a different embodiment to provide a positive guidance of the cam 43 along a cam guide which will be formed by a slot or groove in the upper surface 19.

It will be noted that the lateral surface 54 of the cam guide 50 is not rectilinear, but has a projection 50a adjacent the first end 51. This projection 50a forms a hard point when the cam 43 slides along the cam guide, which permits carrying out a certain blockage of the cam 43 when it is against the first end 51 of the guide. This arrangement requires the user to exert force to leave the unlocked position of the locking control 18, and as a result, this unlocked position is stable.

As can be better seen in FIGS. 6 and 8, the rim 9 of the opening comprises two reliefs 59 projecting toward the central axis Z and the lid 12 comprises on the piece 15 two hollow reliefs 60 that are complementary. The reliefs (59, 60) coact together when the cylindrical lid 12 is placed with a correct orientation relative to the rim 9 of the opening, such that the tongue 14 will be positioned facing the spout 3, thereby ensuring reliable operation. However, with a lid in which the tongue is not entirely retracted, this reliable operation could be realized by the tongue itself.

In the present embodiment, the reliefs (59, 60) moreover ensure an anti-rotation function of the lid relative to the rim 9 of the opening, after emplacement of the lid 12. Thus, the couple exerted on the control member 18 from the unlocked position, in which the tongue is retracted, to carry out rotation of said member 18 toward the locked position, gives rise to no rotation of the bottom 15 of the lid 12.

In the illustrated embodiment, the spout 3 is separated from the opening 10 by a partition 62 of the rim 9. As is better seen in FIG. 2, the partition 62 extends in prolongation of the rim 9 from the summit of the vertical portion of the rim, but over a lesser height to provide an opening 63 which opens into the spout 3 and in which the tongue 14 can extend toward the spout 3. When the tongue 14 is in the extended position, which is to say when the locking control 18 is in the locked position, this latter is positioned adjacent to the lower end of the partition 62, such that the lid 12 is immobilized on the housing 2 of the kettle. The opening 63 and the tongue 14 thus form a second retention element secured to the housing and hence a second lock movable relative to the lid, in addition to that formed by the window 25 of the rim 9 and the lug 24 of the lever 41.

It is envisageable to provide only the tongue 14 and the opening 63 to ensure the locking of the lid on the housing. However, the presence of two points of locking, which moreover are diametrically opposite relative to the central axis Z, ensures a particularly reliable holding of the lid on the housing even if the kettle is inverted.

It will be noted that the lock movable relative to the lid could be made differently. For example, the locking control 18 could have one or several radial tongues extending outwardly which would come into engagement with hooks formed on the housing 2 during movement of the control 18 from the unlocked to the locked position.

When the user wishes to close the kettle, he takes the cover 12 which is naturally in the configuration shown in FIG. 4, which is to say with the locking control 18 in the unlocked position as will be seen hereafter. In this arrangement, the tongue 14 and the lug 24 are in retracted position and the lid has minimum size.

Thanks to the reliefs (59, 60), the lid 12 can enter into the rim 9 only with the orientation shown in FIG. 5. In this orientation, the reference arrow of the control member 18 is disposed at an angle of about 30° from the other reference arrow located on the handle 4, which corresponds to the unlocked position, which position can be signaled by a pictogram opposed on the upper edge 2b of the housing.

As is better shown in FIG. 6, the tongue 14 faces the spout 3 and the lug 24 faces the window 25 of the rim, whilst being always retracted. The retraction of the tongue 14 and of the lug 24 is obtained by pressure of the cam 43 against the first end 51 of the cam guide 50, symbolically shown by a broken line in FIG. 6. Of course, in this position, the user can withdraw the lid by exerting vertical traction on the control 18.

To lock the lid on the kettle, the user carries out a rotation in a clockwise direction of about 30° of the control 18 to obtain the configuration shown in FIG. 7, in which the reference character of the locking control 18 comes into registry with the reference character of the handle 4. In the course of this rotation, the cam 43 of the pivoting lever 41 slides along the cam guide 50 and reaches the second end 52 of the latter. The first end 41a of the pivoting lever carries out a substantially outwardly radial movement and the lug projects through the corresponding window 27 of the lid to come into engagement in the window 25 of the rim 9. This pivoting of the lever 41 also gives rise, by means of the pivoting member 45 and of the straight rack 49, to an outward radial sliding movement of the tongue 14 through the opening 63. There will thus be caused a closure of the spout 3 by the tongue 14 and a double locking of the lid, both by the lug 24 and by the tongue 14.

In this arrangement shown in FIG. 7, the actuation of the trigger permits retracting more or less partially the tongue 14 into the lid to permit pouring the liquid.

If the user desires to open the kettle from the locked configuration, he must carry out a rotation in the counterclockwise direction of the locking control 18 to come into the configuration shown in FIG. 5 in which the locking control 18 is in the unlocked position. This unlocked position of the control is stable, particularly thanks to the projection 50a of the cam guide and to the friction of the upper surface 19 against the bottom 15 which forms the lid. Then, the user withdraws the lid 12 from the rim 9 of the opening, which is in the configuration shown in FIG. 4, and this without supplemental operation to retract the lug and tongue. As a result, without supplemental manipulation of the locking control 18 relative to the lid 12, the tongue 14 is always retracted into the lid when the latter is removed from the kettle.

It will be noted that the assembly of the elements of the actuating mechanism 40, namely the pivoting lever 41, the pivoting member 45 and the straight rack 49 are movable in a plane which is parallel to the mean plane of the opening whose trace P is shown in FIG. 2, or else perpendicular to the central axis Z. This arrangement permits providing a cover whose size in the normal direction Z of the opening 10 is particularly reduced. But of course, it is not excluded to use an actuating mechanism arranged differently to achieve the objects of the invention; similarly, the shapes of the filling opening, of the locking means and of the spout can be substantially different.

The invention claimed is:

1. An electric apparatus for heating liquid, comprising:
   a housing (2) which defines a chamber adapted to contain a liquid;
   an upper opening (10) for filling the chamber, which is delimited by a rim (9);
   electric heating means for the liquid;
   a spout (3) communicating with said chamber and extending adjacent the opening; and
   a lid (12) adapted to close said opening, said lid comprising:
   a movable lock (24) comprising the lid which is adapted to come into engagement with a retaining element (25) of the housing;
   a locking control (18) comprising the lid connected to the lock and movable between a locked position in which the lock is in engagement with the retaining element when the lid is in place and an unlocked position in which the lock is inoperable; and
   a tongue (14) comprising the lid movable between a retracted position in which it is disposed in the lid and an extended position in which it closes the spout (3), the lock, the locking control and the tongue being housed or contained inside the lid of the apparatus, and the lock, the locking control and the tongue being an integral part of the lid, wherein the tongue (14) is connected to the locking control (18) by an actuating mechanism (40) adapted to place the tongue (14) either in extended position when the locking control (18) is in locked position, or in retracted position when the locking control (18) is in unlocked position, said unlocked position being stable.

2. The apparatus according to claim 1, in which the tongue (14) is slidably mounted relative to the cover (12) in a substantially radial direction relative to the normal direction (Z) of the opening, and in which the locking control (18) is rotatably mounted relative to the cover about an axis substantially parallel to said normal direction.

3. The apparatus according to claim 2, in which the cover (12) is removably mounted in the rim (9) of the opening (10), and comprises a bottom (15) coming into contact with said rim (9) of the opening and an upper surface (19, 20) which forms the locking control (18), said bottom (15) and said rim (9) having reliefs (59, 60) adapted to coact together so as to prevent the rotation of the bottom (15) relative to the housing (2).

4. An electric apparatus for heating liquid, comprising:
   a housing (2) which defines a chamber adapted to contain a liquid;
   an upper opening (10) for filling the chamber, which is delimited by a rim (9);
   electric heating means for the liquid; a spout (3) communicating with said chamber and extending adjacent the opening; and
   a lid (12) adapted to close said opening, said lid comprising:
   a movable lock (24) which is adapted to come into engagement with a retaining element (25) of the housing;
   a locking control (18) connected to the lock and movable between a locked position in which the lock is in engagement with the retaining element when the lid is in place and an unlocked position in which the lock is inoperable; and
   a tongue (14) movable between a retracted position in which it is disposed in the lid and an extended position in which it closes the spout (3), wherein the tongue (14) is connected to the locking control (18) by an actuating mechanism (40) adapted to place the tongue (14) either in extended position when the locking control (18) is in locked position, or in retracted position when the locking control (18) is in unlocked position, said unlocked position being stable,
   wherein the actuating mechanism (40) comprises a pivoting lever (41) provided with a cam (43), and in which the locking control (18) has an internal surface comprising a cam guide (50) which extends from a first end (51) to a second end (52) arranged at a distance from the pivotal axis (Z) of the locking control which is greater than the distance from the first end to said axis, said cam (43) following said cam guide (50) from the first end to the second end when the locking control (18) passes from the unlocked position to the locked position, and vice versa.

5. The apparatus according to claim 4, in which the pivoting lever (41) has a first end (41a) comprising a lug (24) which forms the lock, which is retracted into the lid (12) when the locking control (18) is in unlocked position, and which projects through a window of the lid (12) when the locking control (18) is in locked position, said lug (24) being adapted to come into engagement with the retaining element (25) arranged in the rim (9) of the opening when the locking control (18) passes from the unlocked position to the locked position.

6. The apparatus according to claim 4, in which the cam (43) of the pivoting lever (41) is urged against the cam guide (50) of the locking control (18) by resilient means (55).

7. The apparatus according to claim 4, in which the actuating mechanism (40) comprises a member (45) pivoting about an axle (46) substantially parallel to the normal direction (Z) of the opening, and in which the pivoting lever (41) has a second end provided with teeth (44) which engage with a first toothed sector (48) provided on the pivoting member (45), said pivoting member (45) being provided with at least one second toothed sector (47) which engages a straight rack (49) connected to the tongue (14).

8. The apparatus according to claim 7, in which said lever and pivoting member (41, 45) are adapted to create an amplified linear movement of the tongue (14) relative to the movement of the first end (41a) of said lever (41).

9. The apparatus according to claim 1, in which the assembly of the elements (41, 45, 49) of the actuating mechanism (40) is movable in a plane parallel to the median plane (P) of the opening (10).

10. The apparatus according to claim 1, in which the housing (2) has an opening (63) which opens into the spout (3) and into which extends the tongue (14) when the locking control (18) is in locked position.

11. The apparatus according to claim 3, in which the actuating mechanism (40) comprises a pivoting lever (41) provided with a cam (43), and in which the locking control (18) has an internal surface comprising a cam guide (50) which extends from a first end (51) to a second end (52) arranged at a distance from the pivotal axis (Z) of the locking control which is greater than the distance from the first end to said axis, said cam (43) following said cam guide (50) from the first end to the second end when the locking control (18) passes from the unlocked position to the locked position, and vice versa.

12. The apparatus according to claim 5, in which the cam (43) of the pivoting lever (41) is urged against the cam guide (50) of the locking control (18) by resilient means (55).

13. An electric apparatus for heating liquid, comprising:
- a housing (2) which defines a chamber adapted to contain a liquid;
- an upper opening (10) for filling the chamber, which is delimited by a rim (9);
- an electric heater to heat the liquid;
- a spout (3) communicating with said chamber and extending adjacent the opening; and
- a lid (12) adapted to close said opening, said lid comprising:
  - a movable lock (24) comprising the lid which is adapted to come into engagement with a retaining element (25) of the housing;
  - a locking control (18) comprising the lid connected to the lock and movable between a locked position in which the lock is in engagement with the retaining element when the lid is in place and an unlocked position in which the lock is inoperable; and
  - a tongue (14) comprising the lid movable between a retracted position in which it is disposed in the lid and an extended position in which it closes the spout (3), the lock, the locking control and the tongue being housed or contained inside the lid of the apparatus, and the lock, the locking control and the tongue being an integral part of the lid, wherein the tongue (14) is connected to the locking control (18) by an actuating mechanism (40) adapted to place the tongue (14) either in extended position when the locking control (18) is in locked position, or in retracted position when the locking control (18) is in unlocked position, said unlocked position being stable.

14. The apparatus according to claim 13, in which the tongue (14) is slidably mounted relative to the cover (12) in a substantially radial direction relative to the normal direction (Z) of the opening, and in which the locking control (18) is rotatably mounted relative to the cover about an axis substantially parallel to said normal direction.

15. The apparatus according to claim 14, in which the cover (12) is removably mounted in the rim (9) of the opening (10), and comprises a bottom (15) coming into contact with said rim (9) of the opening and an upper surface (19, 20) which forms the locking control (18), said bottom (15) and said rim (9) having reliefs (59, 60) adapted to coact together so as to prevent the rotation of the bottom (15) relative to the housing (2).

16. The apparatus according to claim 13, in which the assembly of the elements (41, 45, 49) of the actuating mechanism (40) is movable in a plane parallel to the median plane (P) of the opening (10).

17. The apparatus according to claim 13, in which the housing (2) has an opening (63) which opens into the spout (3) and into which extends the tongue (14) when the locking control (18) is in locked position.

18. The apparatus according to claim 15, in which the actuating mechanism (40) comprises a pivoting lever (41) provided with a cam (43), and in which the locking control (18) has an internal surface comprising a cam guide (50) which extends from a first end (51) to a second end (52) arranged at a distance from the pivotal axis (Z) of the locking control which is greater than the distance from the first end to said axis, said cam (43) following said cam guide (50) from the first end to the second end when the locking control (18) passes from the unlocked position to the locked position, and vice versa.

* * * * *

UNITED STATES PATENT AND TRADEMARK OFFICE
CERTIFICATE OF CORRECTION

| | | |
|---|---|---|
| PATENT NO. | : 7,569,797 B2 | |
| APPLICATION NO. | : 11/547142 | |
| DATED | : August 4, 2009 | |
| INVENTOR(S) | : Guy Labelle et al. | |

It is certified that error appears in the above-identified patent and that said Letters Patent is hereby corrected as shown below:

On the title page, amend Item (54) to read as follows:

--ELECTRIC LIQUID-HEATING APPLIANCE--.

Signed and Sealed this

Eighth Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,569,797 B2 | Page 1 of 1 |
| APPLICATION NO. | : 11/547142 | |
| DATED | : August 4, 2009 | |
| INVENTOR(S) | : Guy Labelle et al. | |

It is certified that error appears in the above-identified patent and that said Letters Patent is hereby corrected as shown below:

On the title page, amend Item (54) and Column 1, line 1 to read as follows:

--ELECTRIC LIQUID-HEATING APPLIANCE--.

This certificate supersedes the Certificate of Correction issued September 8, 2009.

Signed and Sealed this

Twenty-ninth Day of September, 2009

David J. Kappos
*Director of the United States Patent and Trademark Office*